Patented May 20, 1952

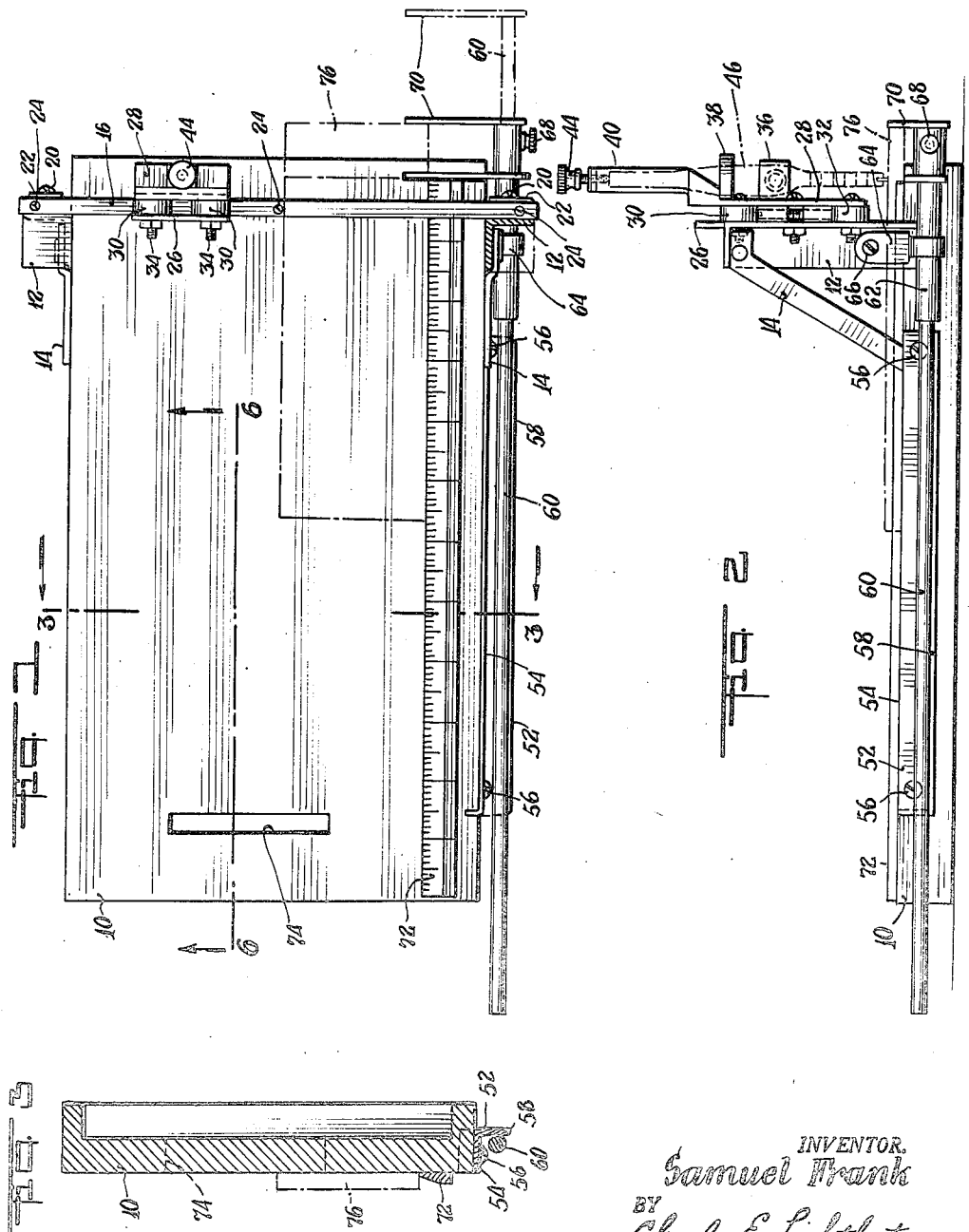

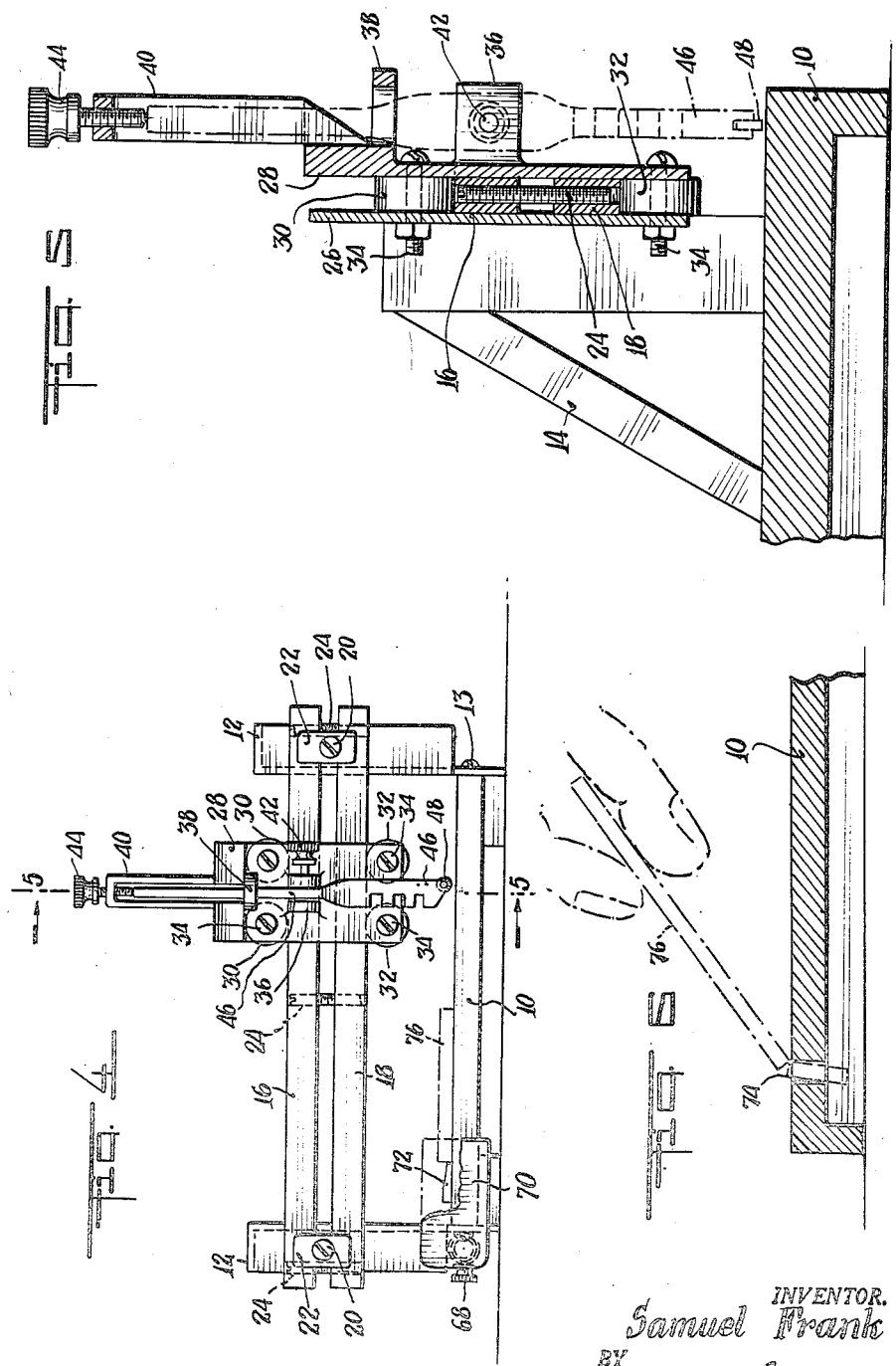

2,597,311

UNITED STATES PATENT OFFICE 2,597,311

GLASS-CUTTING APPARATUS

Samuel Frank, Houston, Tex.

Application May 25, 1950, Serial No. 164,148

4 Claims. (Cl. 33—32)

This invention relates to glass cutting apparatus, and more particularly to a device for accurately measuring and cutting plates of glass.

While not limited to such use, the invention finds particular application in the preparation of glass counter displays and counter compartments for the display of merchandise in stores. In the building up of counter displays and compartments for the arrangement of merchandise on the counters of department stores, plates of glass are frequently employed, because of their transparency and the ease with which they can be arranged and assembled to produce a wide variety of simple and attractive supports and compartments of different sizes. Glass plates for such purposes must often be provided in a large number of different sizes, and in order to facilitate the work individual pieces of glass must frequently be cut to the desired sizes as the plates are being assembled. The accurate measuring, holding, and cutting of the glass under these circumstances presents a difficult task, and is a hazardous and time consuming operation, especially when undertaken by unskilled persons.

It is an important object of this invention, therefore, to provide glass cutting apparatus to facilitate the rapid and accurate measuring and cutting of glass plates, whereby inexperienced persons may readily produce large numbers of pieces of any desired sizes with uniformly satisfactory results and little danger of injury to the operator.

Another object of the invention is the provision of glass cutting apparatus, which is capable of use with glass of widely varying thickness, and which has means for regulating the pressure exerted by the cutter on the glass during the cutting operation.

A further object of the invention is to provide glass cutting apparatus having cutter supporting and guiding structure, whereby the cutter is rigidly supported for accurate movement in engagement with the glass to produce a straight and uniform cut, so that the glass will break with a straight, even edge after cutting.

Another object of the invention is the provision of glass cutting apparatus having means for adjustment to compensate for wear, so that the parts may be maintained at all times in accurate alignment, and wobbling of moving parts can be eliminated.

A further object of the invention is to provide glass cutting apparatus incorporating means for accurately measuring and positioning the glass to be cut and also having adjustable means for engaging the glass and positioning the same so that any number of pieces of the same size may be cut successively after a single adjustment of the apparatus.

Another object of the invention is the provision in glass cutting apparatus of a combined structure comprising glass measuring and holding means and cutter supporting and guiding means to facilitate the cutting of glass plates.

A still further object of the invention is to provide glass cutting apparatus of simple design and rugged construction capable of withstanding the hard usage and rough handling to which such apparatus is likely to be subjected.

The invention will best be understood from the following detailed description constituting a specification of the same when taken in conjunction with the annexed drawings, wherein;

Figure 1 is a top plan view of the invention;

Figure 2 is a front elevational view of the same;

Figure 3 is a cross sectional view, on a somewhat enlarged scale, taken along the line 3—3 of Figure 1, looking in the direction indicated by the arrows;

Figure 4 is an end elevational view, looking at the right hand end of the invention as seen in Figure 1;

Figure 5 is a vertical cross-sectional view, on a somewhat enlarged scale, taken along the line 5—5 of Figure 4, looking in the direction indicated by the arrows, and;

Figure 6 is fragmentary cross-sectional view, on a somewhat enlarge scale, taken along the line 6—6 of Figure 1, looking in the direction indicated by the arrows.

Referring now to the drawings in greater detail, wherein like numerals of reference designate the same parts throughout the several views, the numeral 10 indicates the base of the glass cutting apparatus, which may be formed of any desired material, such as wood, metal, or the like. At one end of the base 10 upstanding supports 12 are suitably secured to opposite sides of the base as by screws 13. The supports 12 are preferably of angle formation and may have braces 14 extending diagonally from the supports 12 downwardly for attachment at their lower ends to the base 10. The supports 12 and braces 14 may conveniently be integrally formed as single pieces, in which case the braces may take the form of triangular flanges formed on the supports.

A trackway formed of spaced apart bars 16 and 18 extends between the supports 12 and is secured thereto by means of screws 20 passing through plates 22 which engage the outer sides of the bars. The bars are thus clamped between the supports 12 and plates 22. Set screws are threaded into the bars 16 and 18 at spaced intervals throughout their length, these screws having their opposite ends oppositely threaded so that the distance between the bars may be accurately adjusted. The set screws 24 have their ends disposed within the bars so that they will not obstruct the passage of the cutter carriage, later to be described, along the trackway.

A carriage comprising inner and outer spaced plates 26 and 28, respectively, between which upper and lower rollers 30 and 32, respectively, are carried is supported on the trackway for movement therealong. The rollers 30 and 32 may conveniently be journalled on ball bearings, not shown, carried on bolts 34, which serve to secure the inner and outer plates of the carriage together. This structure provides a very smooth running and easily adjusted carriage capable of being readily rolled back and forth along the trackway.

The outer plate 28 of the carriage is preferably of cast integral formation having spaced outstanding lugs 36, an outstanding eye 38 above the lugs 36, and an upstanding loop 40 thereon, as best seen in Figures 4 and 5. One of the lugs 36 has a thumb screw 42 passing therethrough for a purpose later to be made apparent. The upstanding loop 40 also has a thumb screw 44 passing vertically through the top of the loop.

A glass cutter 46 of conventional design is carried on the outer plate 28, and has a handle adapted to be received between the lugs 36 and extending upwardly through the eye 38 and into the loop 40, as is best seen in Figures 4 and 5. The glass cutter has a cutting blade 48 at its lower end, and when positioned on the carriage as described may be securely held thereon by tightening the thumb screw 42.

Along the front edge of the base 10 there is an angle member 52 secured by its vertical flange 54 to the base by means of screws 56, and having its horizontal flange 58 outstanding from the base. A rod 60 is slidably supported on the flange 58, and passes through a sleeve 62 which is held in a clip 64 secured to one of the supports 12 by a screw 66. The rod sleeve 62 has a thumb screw 68 passing therethrough which may be tightened against the rod 60 to hold the rod in any desired adjusted position. At its outer end the rod 60 carries a stop member in the form of a plate 70 attached to the end of the rod.

On the upper surface of the base 10, a ruler or similar measuring device 72 is positioned, having an edge portion extending somewhat above the surface of the base, for engagement with a piece of glass to be cut, in order to position the same on the base. At the opposite end of the base from the carriage there is an opening 74 for the insertion of a piece of glass which has been cut or scored, in order that the same may be easily broken, as seen in Figure 6.

In making use of the glass cutting apparatus as described above, a conventional glass cutter 46 is positioned with its handle between the lugs 36 and extending through the eye 38 and upwardly into the loop 40. A plate of glass indicated in dash outline at 76 is then positioned on the base in engagement with the ruler 72. The carriage is moved to bring the cutter 46 above the glass and the blade 48 of the cutter is engaged with the surface of the glass. Thumb screw 42 is tightened sufficiently to hold the cutter in position. The thumb screw 44 may then be screwed downwardly in the loop 40 into engagement with the end of the handle of the cutter to force the cutter blade 48 down against the glass with the desired degree of pressure. After the blade has been thus adjusted the thumb screw 44 may be tightened to securely hold the cutter in adjusted position.

By moving the carriage along the trackway the cutter when adjusted as described makes a uniform scratch or cut in the surface of the glass. The glass may be inserted in the opening 74 with the scratch just above the base, so that by pressing against the glass on the same side as the scratch, the glass may be cleanly and evenly broken.

If it is desired to cut a number of pieces of glass of the same length, a piece of glass is laid on the base and moved along the ruler 72 until the desired length extends beyond the blade of the cutter. The rod 60 is then adjusted until the stop member 70 is in engagement with the outer end of the glass, and the thumb screw 68 is tightened to hold the stop in this position. The piece of glass is cut and subsequent pieces positioned on the base with their outer ends in contact with the stop, whereby all pieces so cut will be of the same length.

The inner and outer plates 26 and 28, respectively, of the carriage may be separated by a distance very nearly equal to the width of the bars 16 and 18 so that the bolts 34 may be tightened if necessary to reduce any looseness or wobbling of the carriage on the trackway. In the event that the trackway becomes worn by contact with the rollers 30 and 32, any loose play due to wear may be taken up by adjusting the screws 24 to move the bars into firm rolling contact with the rollers.

It will thus be seen that the invention as described above provides a convenient means for cutting glass, whereby unskilled and inexperienced persons can quickly and safely perform a task which has heretofore been hazardous and uncertain in results.

The invention is of general utility in the cutting of glass plates of all kinds and is not to be limited in application to the specific example set forth herein. While the invention has been disclosed in connection with a particular embodiment, of the same, it is to be understood that this is by way of illustration only, and numerous changes can be made in the structure and arrangement of the various parts without departing from the spirit of the invention or the scope of the appended claims.

Having thus clearly shown and described the invention, what is claimed as new and desired to secure by Letters Patent is:

1. Glass cutting apparatus comprising a base having a flat upper surface, adapted to support a plate of glass thereon, upright supports secured to opposite sides of said base and extending above said surface, a horizontal trackway including upper and lower vertically spaced parallel bars secured to said supports and extending across said base in spaced parallel relation to said surface, a carriage mounted on said trackway for movement across said base, spaced upper and lower vertical rollers on said carriage said upper rollers being supportingly engageable with the upper face of said upper bar, and said lower rollers being engageable with the lower surface of said lower bar, adjustable means connecting said bars for varying the distance between said bars to adjust the contact of said bars with said rollers, glass cutting means mounted on said carriage for vertical movement thereon into engagement with a plate of glass positioned on said surface and means on said carriage engageable with said cutter means for adjusting the pressure of said cutter means on the glass.

2. Glass cutting apparatus comprising a base having a flat glass-supporting upper surface, upright supports secured to opposite sides of said base, a trackway including vertically spaced superposed bars secured to said supports in spaced parallel relation to said surface, a carriage mounted on said trackway and including a plate on each side of the trackway, rollers carried between the plates and engageable with the uppermost and lowermost surfaces of said trackway to support said carriage on the trackway for movement across said base, means connecting said bars for varying the distance between said bars to take up wear between said bars and said rollers, glass cutting means mounted on said carriage for vertical movement thereon into engagement with a plate of glass on said surface and means on said carriage cooperable with said cutting means for varying the pressure of the cutting means on said glass.

3. Glass cutting apparatus comprising a base having a flat glass-supporting upper surface, upright supports secured to opposite sides of said base, a trackway including spaced bars secured to said supports in spaced parallel relation to said surface, a carriage mounted on said trackway and including a plate on each side of the trackway, rollers carried between the plates and engageable with said trackway to support said carriage on the trackway for movement across said base, means connecting said plates for moving the plates toward each other to take up wear between said plates and said bars. Glass cutting means mounted on said carriage for vertical movement thereon into engagement with a plate of glass on said surface and means on said carriage cooperable with said cutting means for varying the pressure of the cutting means on the glass.

4. Glass cutting apparatus comprising a base having a flat glass-supporting upper surface, upright supports secured to opposite sides of said base, a trackway including superposed bars secured to said supports in spaced parallel relation to said surface, a carriage mounted on said trackway and including a plate on each side of the trackway, rollers carried between the plates and engageable with the uppermost and lowermost surfaces of said trackway to support said carriage on the trackway for movement across said base, means connecting said plates for moving the plates toward each other to take up wear between said plates and said bars, means connecting said bars for varying the distance between said bars to take up wear between said bars and said rollers, glass cutting means mounted on said carriage for vertical movement thereon into engagement with a plate of glass on said surface and means on said carriage cooperable with said cutting means for varying the pressure of the cutting means on said glass.

SAMUEL FRANK.

REFERENCES CITED

The following references are of record in the file of this patent:

UNITED STATES PATENTS

| Number | Name | Date |
|---|---|---|
| 500,366 | Billups | June 27, 1893 |
| 725,288 | Roualt | Apr. 14, 1903 |
| 1,167,254 | Benson | Jan. 4, 1916 |
| 2,357,206 | Klages | Aug. 29, 1944 |

FOREIGN PATENTS

| Number | Country | Date |
|---|---|---|
| 488,864 | France | July 30, 1918 |
| 521,750 | Germany | Sept. 7, 1931 |